(12) United States Patent
Bist et al.

(10) Patent No.: US 10,645,359 B2
(45) Date of Patent: May 5, 2020

(54) METHOD FOR PROCESSING A DIGITAL IMAGE, DEVICE, TERMINAL EQUIPMENT AND ASSOCIATED COMPUTER PROGRAM

(71) Applicant: B<>COM, Cesson Sevigne (FR)

(72) Inventors: Cambodge Bist, Rennes (FR); Remi Cozot, Yvignac la Tour (FR); Gerard Madec, Chasne sur Illet (FR)

(73) Assignee: B<>COM, Cesson Sevigne (FR)

( * ) Notice: Subject to any disclaimer, the term of this patent is extended or adjusted under 35 U.S.C. 154(b) by 0 days.

(21) Appl. No.: 16/288,554

(22) Filed: Feb. 28, 2019

(65) Prior Publication Data
US 2020/0068183 A1 Feb. 27, 2020

Related U.S. Application Data

(63) Continuation-in-part of application No. 16/063,441, filed as application No. PCT/FR2016/053321 on Dec. 9, 2016, now Pat. No. 10,326,971.

(30) Foreign Application Priority Data

Dec. 16, 2015 (FR) ...................................... 15 62446
Jul. 29, 2016 (FR) ...................................... 16 57443

(51) Int. Cl.
*H04N 9/77* (2006.01)
*H04N 9/64* (2006.01)

(52) U.S. Cl.
CPC ..................................... *H04N 9/77* (2013.01)

(58) Field of Classification Search
CPC ........... H04N 9/77; H04N 9/646; H04N 9/64; H04N 9/641; H04N 9/67; G06T 5/009;
(Continued)

(56) References Cited

U.S. PATENT DOCUMENTS

2003/0206592 A1 11/2003 Srinivasan et al.
2016/0292836 A1 10/2016 Perry et al.

OTHER PUBLICATIONS

International Search Report dated Feb. 21, 2017, for corresponding International Application No. PCT/FR2016/053321, filed Dec. 9, 2016.

(Continued)

*Primary Examiner* — Sherrie Hsia
(74) *Attorney, Agent, or Firm* — David D. Brush; Westman, Champlin & Koehler, P.A.

(57) ABSTRACT

A method for processing a digital image including image elements having a first luminance component. The first luminance component has a first value in a first predetermined interval. The display can render second values of second luminance components included in a second predetermined interval. The method includes: determining information representative of image brightness perceived by an observer, based on the first values of the first luminance component; calculating an expansion exponent as a function of the determined brightness information; transforming the first luminance components into the second luminance components, including calculating an intermediate luminance value by applying the calculated expansion exponent to the first luminance component value, multiplying the intermediate value by a length of the second interval, and obtaining the second value of the second luminance component based on the multiplied intermediate luminance value. The expansion exponent is based on a logarithm, of the determined brightness information.

12 Claims, 7 Drawing Sheets

(58) Field of Classification Search
CPC ........ G06T 11/001; G06T 2207/20208; G09G 5/02
USPC ....... 348/453, 659–661, 663, 708, 712, 713; 382/162, 276, 299, 300; 345/604
See application file for complete search history.

(56) References Cited

OTHER PUBLICATIONS

Written Opinion dated Feb. 21, 2017, for corresponding International Application No. PCT/FR2016/053321, filed Dec. 9, 2016.
Belen Masia et al.: "Multilinear Regression for Gamma Expansion of Overexposed Content," Technical Report RR-03-11, Jul. 11, 2011 (Jul. 11, 2011), pp. 1-13, XP055293401.
Ford A et al.: "Colour Space Conversions," Internet Citation, Aug. 11, 1998 (Aug. 11, 1998), XP002311069.
Belen Masia et al. "Evaluation of Reverse Tone Mapping Through Varying Exposure Conditions." ACM Transactions on Graphics, vol. 28, No. 5. Dec. 1, 2009.
Ahmet Oguz Akyuz et al. "Do HDR displays support LDR content? A Psychophysical Evaluation." ACM SIGGRAPH. 2007.
French Search Report and Written Opinion dated Aug. 3, 2016 for corresponding French application No. 1562446, filed Dec. 16, 2015.
English Translation of Written Opinion dated Feb. 21, 2017, for corresponding International Application No. PCT/FR2016/053321, filed Dec. 9, 2016.
Notice of Allowance dated Jan. 24, 2019 for corresponding U.S. Appl. No. 16/063,441, filed Jun. 18, 2018.

METHOD FOR PROCESSING A DIGITAL IMAGE, DEVICE, TERMINAL EQUIPMENT AND ASSOCIATED COMPUTER PROGRAM

1. CROSS-REFERENCE TO RELATED APPLICATIONS

This Application Continuation-in-Part of U.S. application Ser. No. 16/063,441, filed Jun. 18, 2018, which is a Section 371 National Stage Application of International Application No. PCT/FR2016/053321, filed Dec. 9, 2016, the content of which is incorporated herein by reference in its entirety, and published as WO 2017/103399 on Jun. 22, 2017, not in English.

2. FIELD OF THE INVENTION

The field of the invention is that of digital image processing and digital image sequences whose colour information is represented in a first range of values, with a view to rendering them on a display device capable of handling them to represent on a second range of values, superior to the former.

The invention may especially, but not exclusively, apply to the conversion of colour intensities of digital images represented in a standard or SDR format (for "Standard Dynamic Range") to be rendered on a display device conforming to an HDR format (for "High Dynamic Range").

3. PRESENTATION OF THE PRIOR ART

A new generation of audio-visual content reproduction devices can be seen today, such as televisions, so-called HDR which are adapted to display images with a wide range of colour intensities. These screens offer a high peak level and increased levels of contrast between light and dark areas of the image, which gives the user unparalleled proximity to reality.

Currently, this technology still coexists with the SDR format, which remains the reference for the transmission of audio-visual content, so that to take advantage of the increased capabilities of an HDR screen, it is necessary to convert the SDR content received in HDR format before display.

The article by Akyuz et al, entitled «Do HDR displays support LDR content? A Psychophysical Evaluation», published by ACM SIGGRAPH 2007 Papers, page 38, in 2007, discloses a method for expanding the colour intensities of an input digital image, based on a simple linear operator. It comprises calculating the luminance component of the output image $Y_2$ as a simple linear function of the luminance component $Y_1$ of the input image, according to a formula of the type:

$$L_{2(x,y)} = L_{max} \cdot \frac{Y_1(x, y) - Y_{1,min}}{Y_{1,max} - Y_{1,min}} \quad (1)$$

where (x, y) are the coordinates of a image element in the input image, $Y_{1,max}$ the maximum value taken by the luminance component in the input image and $Y_{1,min}$ its minimal value.

The subjective results obtained by Akyuz with this operator are considered as the best in the literature for normally exposed images.

The article by Masia et al, entitled «Evaluation of Reverse Tone Mapping Through Varying Exposure Conditions» published in the journal «ACM Transactions on Graphics», published by ACM, volume 28, page 160, in 2009, discloses a method for expanding colour intensities of a digital image. It consists in particular in applying a non-linear global operator of intensity expansion, to the luminosity information of the elements of the input image. This operator takes the form of an exponent expressed as an affine function of an indicator representative of the image, so-called "image key".

This key indicator is well known to those skilled in the art and is expressed as follows $$k = \frac{\log Y_{moy} - \log Y_{min}}{\log Y_{max} - \log Y_{min}} \quad (2)$$

where $$\log Y_{moy} = \frac{\left(\sum_{x,y} \log(Y(x, y) + \delta)\right)}{n},$$

n the number of elements in the image, Y(x,y) is the luminance intensity of an element of the image and δ is a positive real number that takes a small value to avoid singularities when the intensity of a pixel is zero.

The logarithm of luminance is indeed known as a good approximation of a luminosity or illumination level perceived by the human visual system. The image key k thus provides an indication of a global luminosity of the image, as perceived by an observer.

The global operator for expanding the luminosity intensities of the input image takes the following form:

$$\gamma = a \cdot k + b \quad (3)$$

where a is a real number that is 10.44 and b is a real number with a value of −6.282.

On the set of tested images presented in the article, we can see that the value of the operator γ increases with the value of the image key, the extreme values being equal to 1.1 and 2.26.

An advantage of this solution is that it makes it possible to improve the perceived quality of the images in a simple and realisable way in real time. In particular, it gives good results on exposed images having a sufficient level of contrast.

4. DISADVANTAGES OF THE PRIOR ART

A disadvantage of the methods described in the prior art is that they are not suited for all types of images. In particular, for images having more extreme contrast and luminosity levels than the tested images tested, they confer the processed images an unsightly artificial appearance, which is hardly faithful to the input image.

5. SUMMARY OF THE INVENTION

An exemplary embodiment of the present invention relates to a method comprising the following acts performed by a processing device:
 receiving at least one digital image, said image comprising image elements, an image element being associated with colour information represented in a first colour space comprising a first luminance component said first luminance component having a first value within a first range of predetermined values;

processing the at least one digital image for rendering on a display device, said display device being adapted to restore second values of second luminance components of the image elements included in a second range of predetermined values, wherein the processing comprises:

determining an information representative of a global luminosity level of the image perceived by an observer, based on the first values of the first luminance component of the elements of the image;

calculating an expansion exponent as a function of the global luminosity level information determined;

transforming the first luminance components of the image elements into said second luminance components, comprising for an element of the image, the calculation of an intermediate luminance value by applying the expansion exponent calculated to the first value of the first luminance component, the multiplication of the calculated intermediate value by a length of the second range of predetermined luminance values, and obtaining the second value of the second luminance component based on the multiplied intermediate luminance value, The method according to the invention is remarkable in that the calculated expansion exponent is a decreasing function of the determined global luminosity level information, based on the logarithm of said determined global luminosity level information.

Thus, the invention offers a new and inventive solution for expanding the range of values of the luminance information to adapt the format of an input image to that of the display device whose range is wider.

Unlike the prior art, which chooses an expansion exponent whose value increases with the global luminosity level of the image, the invention offers an expansion exponent whose value decreases when the global luminosity level increases. Moreover the use of the logarithm function allows viewers to get a better visual rendering.

The inventors have identified five classes of image styles representative of the different possible combinations of luminosity and contrast levels of a large set of test sequences. They then implemented an experiment in which they applied different correcting exponent values to the image sequences of each of these style classes, then asked the observer panel to evaluate its perceived quality.

From the results obtained, the inventors have found on the one hand that a particular corrective exponent value could be associated with each of the classes. On the other hand, they have established a simple mathematical relation between the global luminosity level of the images of a class and the corrective exponent value to be applied to the images of this class allowing to obtain an output image, adapted from a perceptual point of view.

According to the invention, the calculated exponent is proportional to the inverse of the logarithm of the information representative of a global luminosity level of the image.

An advantage of this mathematical relation is that it allows a faithful rendering of the lighting style of the image while remaining simple to implement with limited computing resources compatible with real-time processing requirements. Another advantage is that the exponent is adapted to an optical—electrical tone curve, which can be used prior to the step of determining an information representative of a global luminosity as explained below.

According to an advantageous characteristic of the invention, the step of determining a global luminosity level comprises obtaining a median value of the luminance component of the image, in that the information representative of a global luminosity level of the image is proportional to the obtained median value.

An advantage of using the median luminance values of an image is that it takes values that remain stable from one image to another of a sequence of images. This avoids any flickering or fluttering effect during the rendering of the sequence.

Alternatively, the mean value of the luminance component can be obtained, implying a simplification of calculations.

According to another aspect of the invention, when the first range of predetermined values is of length greater than the second range, the transforming act implements the following equations:

$$Y_2 = \left(\frac{Y_1}{L_{max}}\right)^{\frac{1}{\gamma}}$$

$$\text{with } \gamma = \frac{1}{\text{gain} \times \log_{10}(Y_{med}) + \text{offset}}$$

where Y1 designates the first luminance component, Y2 the second luminance component, $L_{max}$ the length of the second range of luminance values, $\log_{10}$ the decimal logarithm, γ the expansion exponent applied to the first luminance component Y1, $Y_{med}$ the median luminance value, gain a predetermined gain value and offset a predetermined offset value.

According to another aspect of the invention, when the second range of predetermined values is of length greater than the first range, the transforming act implements the following equations:

$$Y_2 = L_{max} \cdot Y_1^\gamma$$

$$\text{with } \gamma = \frac{1}{\text{gain} \times \log_{10}(Y_{med}) + \text{offset}}$$

where Y1 designates the first luminance component, Y2 the second luminance component, $L_{max}$ the length of the second range of luminance values, $\log_{10}$ the decimal logarithm, γ the expansion exponent applied to the first luminance component Y1, $Y_{med}$ the median luminance value which is normalised and clipped, gain a predetermined gain value and offset a predetermined offset value.

An advantage of this mathematical expression that links the second luminance component to the first is that it is simple to implement, while ensuring a realistic and respectful rendering of the original lighting style of the input image, regardless of the global luminosity level of the input image.

According to yet another aspect of the invention, the first colour space further comprises first chrominance components, said method further comprising a step of transforming the first chrominance components of the image into second components, by applying to the first chrominance components an expansion coefficient proportional to a ratio between the second luminance component and the first luminance component, according to the following expression:

$$C_2 = \frac{C_1 \cdot Y2}{Y_1}$$

An advantage of this embodiment is its simplicity.

According to another aspect of the invention, the first colour space further comprises first chrominance components, said method further comprising a step of transforming the first chrominance components of the image into second chrominance components, comprising a substep of colour correction by applying to the first chrominance components a correction function which depends on the first and the second luminance components and a saturation factor, which is a reality strictly greater than 1, according to the following expression:

$$C_2 = \left(\left(\frac{C_1}{Y_1} - 1\right) \cdot s + 1\right) Y_2$$

An advantage of this embodiment is that by saturating the chrominance components, it allows for more intense colour rendering.

Advantageously, the step of transforming the first chrominance components comprises a sub-step of converting a first colour space to a second colour space, larger than the first.

One advantage is to avoid the truncation of colour intensities and thus the appearance of defects on the output image.

As an alternative, the step of transforming the first chrominance components comprises a sub-step of converting a first colour space to a second colour space having the same size.

According to another aspect of the invention, the method, further comprising prior to the transforming act, setting the expansion exponent to a first predetermined value if the calculated value is less than said first predetermined value or setting the expansion component to a second predetermined value if the calculated value is greater than said second predetermined value.

An advantage of containing the expansion exponent between the predetermined values is that these values may represent the limits of contrast adjustments required to match the original lighting style of the input image.

The method which has just been described in its different embodiments is advantageously implemented by a device comprising:
- a reprogrammable computing machine or a dedicated computing machine, capable of and configured to:
  receive at least one digital image, said image comprising image elements, an image element being associated with colour information represented in a first colour space comprising a first luminance component separated from chrominance components, said first luminance component having a first value comprised in a first predetermined value range; and
  process the at least one digital image for rendering the image on a display device, said display device being adapted to render second values of second luminance component of the images elements included in a second predetermined range of values, wherein the processing comprises:
  determining an information representative of a global luminosity level of the image, perceived by an observer, based on the values of the first luminance component of the elements of the image;
  calculating an expansion exponent as a function of the global luminosity level information determined;
  transforming the first luminance components of the image elements into said second luminance components, comprising for an element of the image, the calculation of an intermediate luminance value by applying the expansion exponent calculated to the first value of the first luminance component, the multiplication of the intermediate value calculated by a length of the second range of predetermined luminance values, and obtaining the second value of the second luminance component based on the multiplied intermediate luminance value.

Such a device is remarkable in that the calculated expansion exponent is a decreasing function of the determined global luminosity level information, based on the logarithm of said determined global luminosity level information.

Correlatively, the invention also relates to a terminal equipment comprising a receiver capable of and configured to receive a sequence of digital images via a communication network and a transmitter capable of and configured to transmit the sequence of images to a display device capable of and configured to restore it, characterised in that it comprises a device for processing at least one digital image according to the invention.

This terminal equipment may be a personal computer, a set-top box TV, a digital television etc.

The invention further relates to a computer program comprising instructions for implementing the steps of a method for processing at least one digital image as described above, when this program is executed by a processor.

The invention also relates to a computer program comprising instructions for implementing the steps of a method for processing a digital image as described above, when this program is executed by a processor.

These programs can use any programming language. They can be downloaded from a communication network and/or recorded on a computer-readable medium The invention finally relates to a processor-readable recording or storage medium, integrated or not to the device for processing a digital image according to the invention, optionally removable, respectively storing a computer program implementing the processing method, as described above.

6. LIST OF FIGURES

Other features and advantages of the invention will become evident on reading the following description of one particular embodiment of the invention, given by way of illustrative and non-limiting example only, and with the appended drawings among which:

Figure 3:
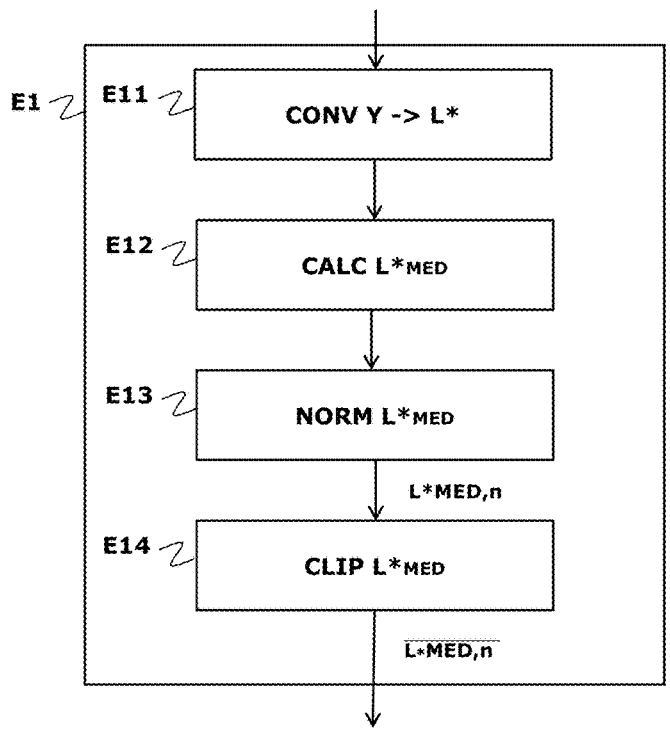
Figure 4A:
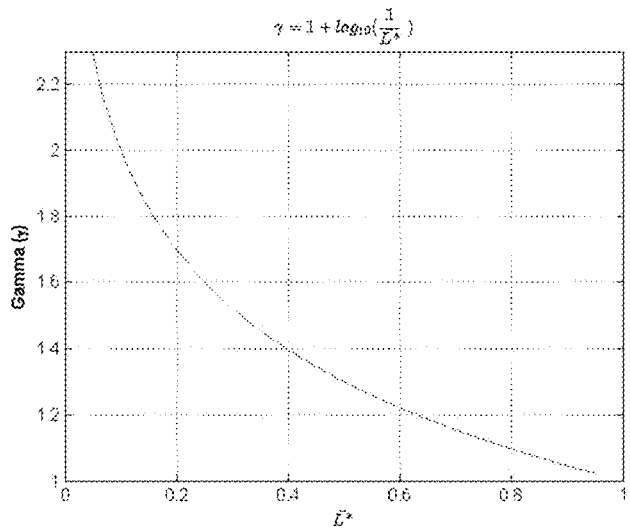
Figure 4B:
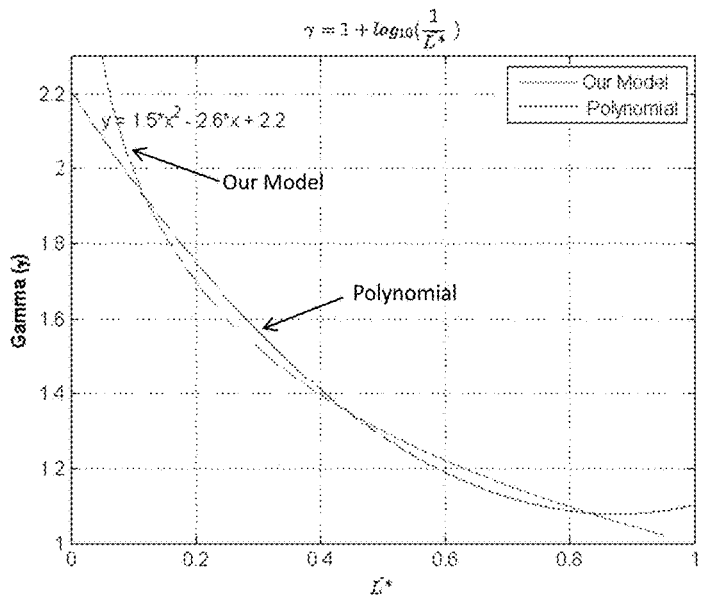
Figure 5:
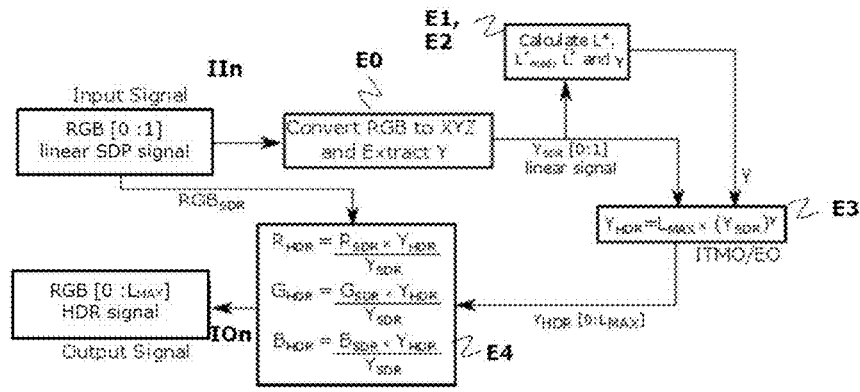
Figure 5A:
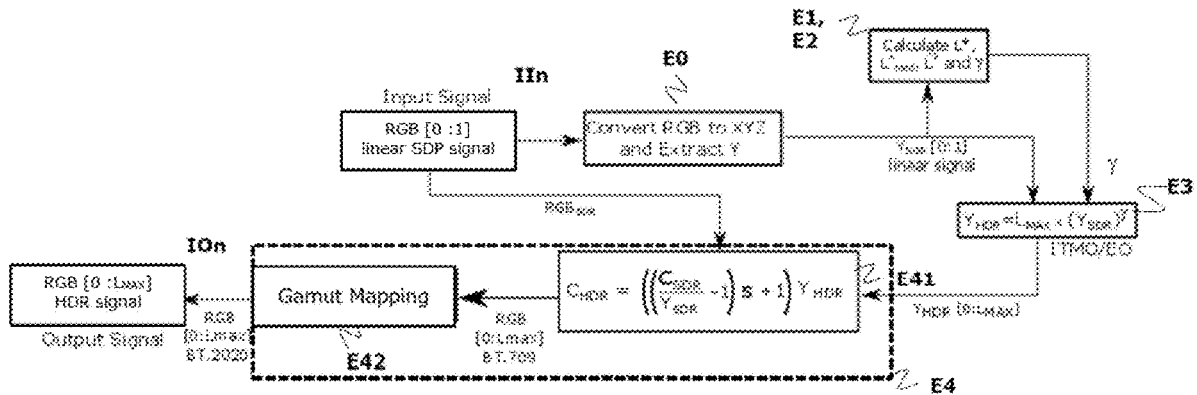
Figure 7:
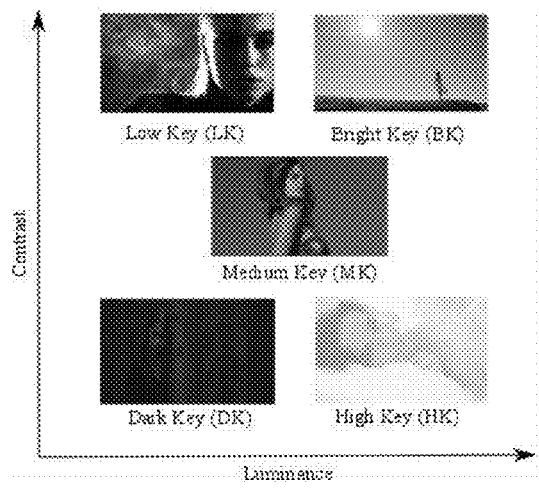
Figure 9:
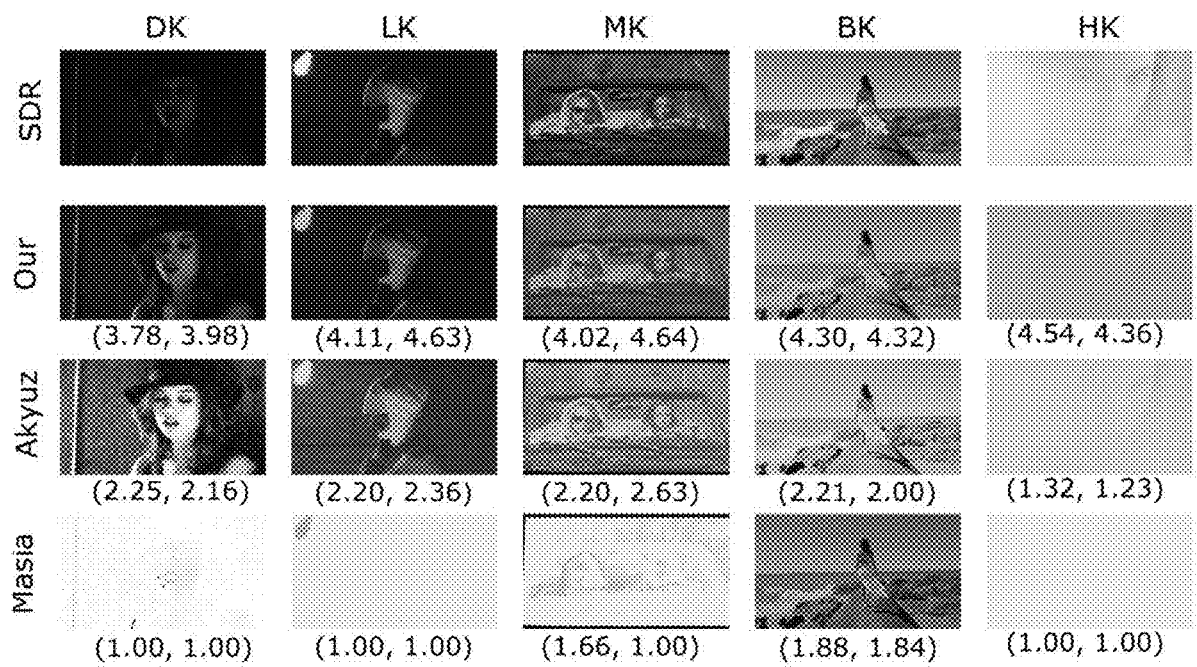
Figure 10:
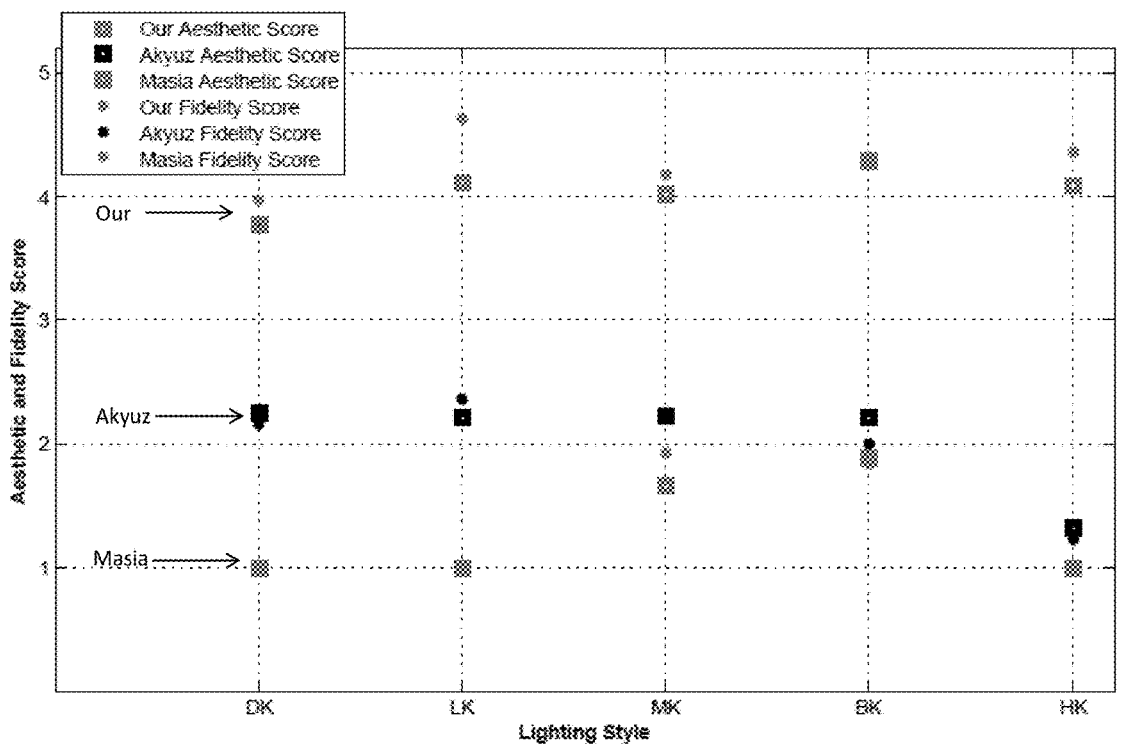
Figure 11:
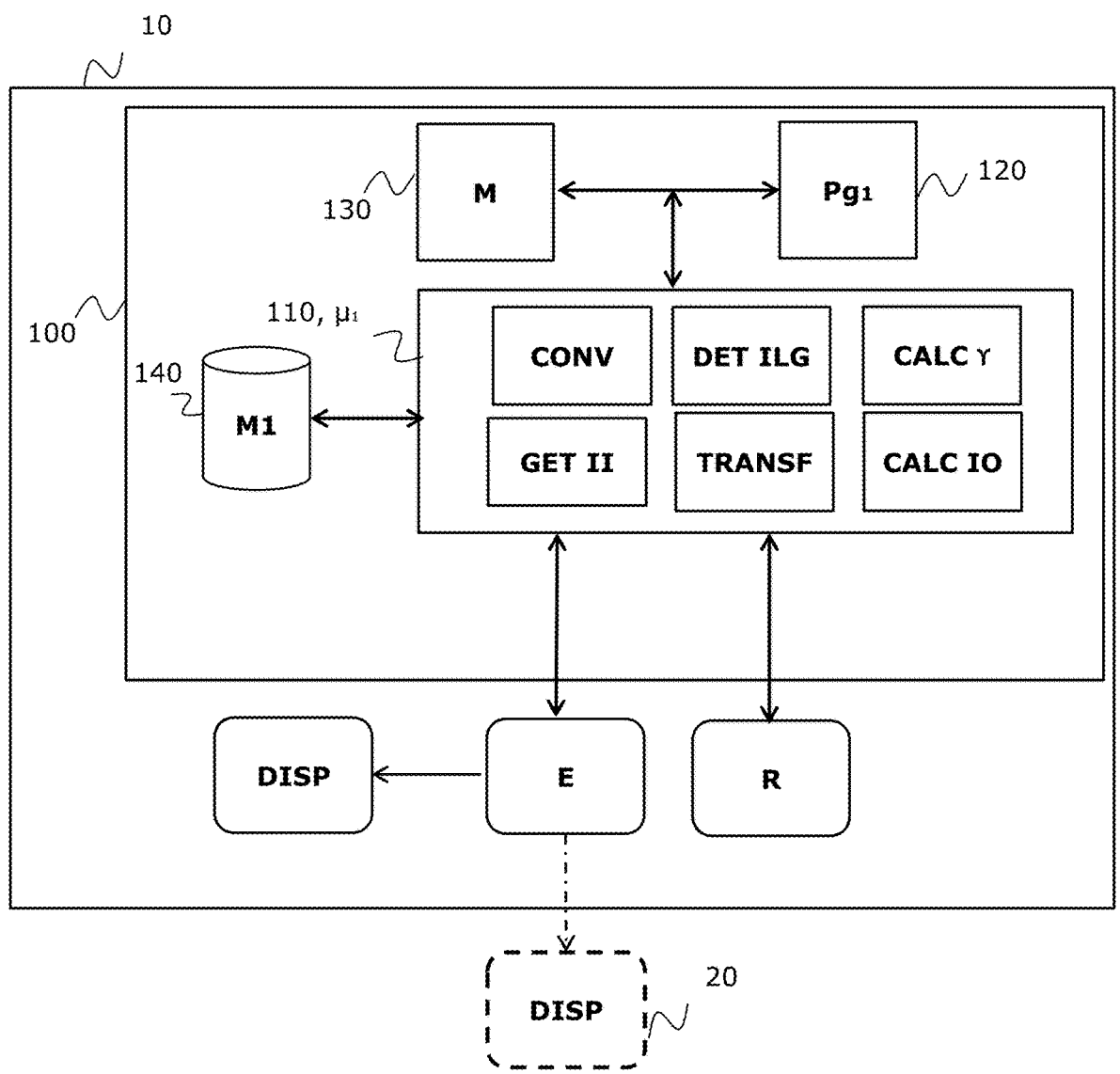

FIG. 3 details the step of determining information representative of a global luminosity level according to one embodiment of the invention;

FIGS. 4A and 4B show examples of decreasing functions of the global luminosity level information according to two embodiments of the invention;

FIG. 5 details the steps of calculating an expansion and derivation exponent of the colour components according to a first embodiment of the invention;

FIG. 5A details the steps of calculating an expansion and derivation exponent of the colour components according to a second embodiment of the invention;

FIGS. 6A to 6D show chromaticity diagrams of the input image and of the output image according to the first and second embodiments of the invention;

FIG. 7 shows examples of classes of lighting styles of input images defined according to their luminosity and their contrast;

FIGS. 8A to 8E show examples of expansion exponent curves obtained by the method for processing a digital image according to the invention for input images belonging to predetermined classes of lighting styles;

FIG. 9 shows in a comparative manner examples of output images obtained after processing according to the invention and according to two solutions of the prior art;

FIG. 10 comparatively shows the results of subjective tests carried out on a set of images with the processing method according to the invention and two solutions of the prior art; and FIG. 11 shows schematically an example of hardware structure of a device for processing a digital image according to an embodiment of the invention.

7. DESCRIPTION OF A PARTICULAR EMBODIMENT OF THE INVENTION

As a reminder, an object of the invention is to provide a method to extend the range of colour intensities of an input image according to a standard format to render it on a display device having to a wider range of colour intensities. The general principle of the invention is based on the determination of an information representative of a global luminosity level of the image as perceived by an observer and on the application to the intensities of the image of an expansion exponent, expressed as a decreasing function of the global luminosity level of the image.

Figure 1:
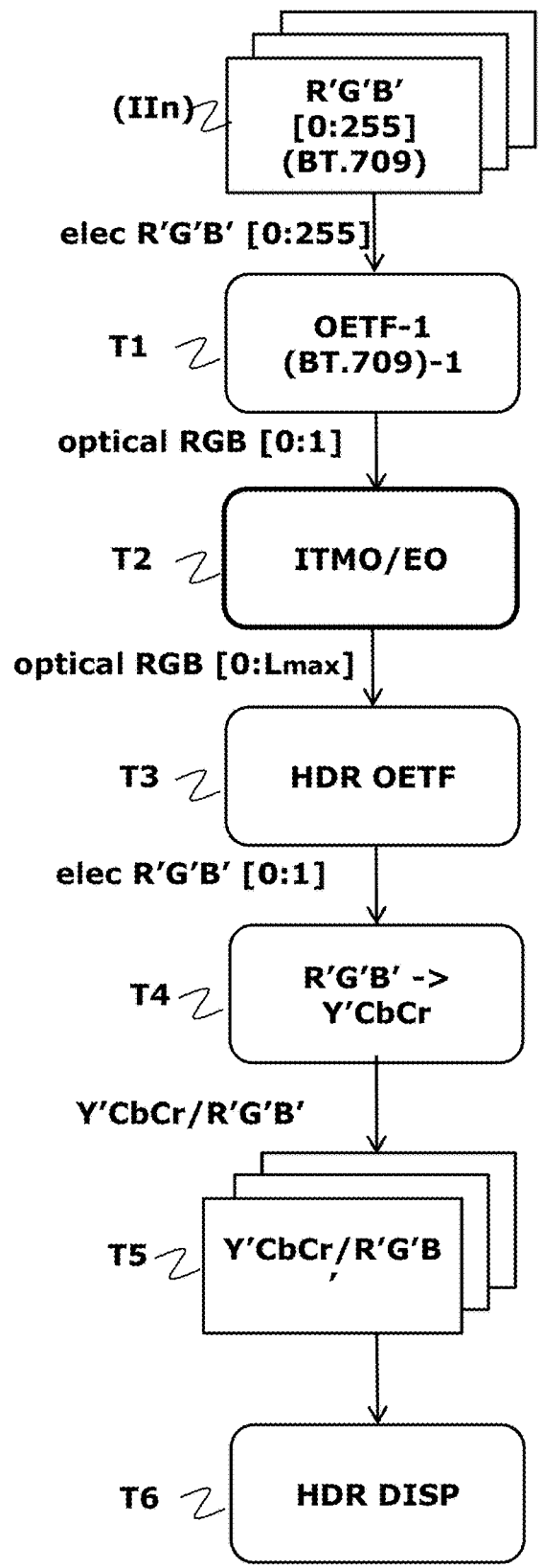
FIG. 1 shows schematically a chain of processing an SDR format image or an input image sequence to provide an image or a sequence of output images in HDR format respectively.

In relation to FIG. 1, we consider a processing chain of an input image sequence ($II_n$) in the SDR format, with n an integer between 0 and N, with N a non-zero integer, in order to display it in HDR format, where luminance values are included in a greater range than luminance values in SDR format.

The images of the input sequence are two-dimensional (2D). Their elements are pixels. Of course, the invention is not limited to this example and also applies to three-dimensional (3D) or multiview images, the elements of which are voxels.

The images of this sequence can take different spatial dimensions such as for example SD images (for Standard Definition), HD (for High Definition), UHD (for Ultra High Definition), 4K, which is four times the definition of an HD and 8K image, which is eight times the definition of an HD image. The input sequence may have various frame rates among the following values of 24, 25, 30, 50, 60, 120 etc. The colour intensities of its image elements can be encoded over a bit depth for example equal to 8, 10, 12 or 16 bits.

It is assumed that this sequence of images has previously been obtained either in raw form directly at the output of an acquisition module, such as for example a video camera, or in decompressed form at the output of a decoder which had received it via a communication network.

For example, the input image sequence ($II_n$) is in the format R'G'B' (for "Red Green Blue") . . . as specified in the BT.709 standard which defines the values of HDTV standards for the production and international exchange of audio-visual programs. The colour information is expressed in three components R', G', B' which each take values between 0 and 255.

Of course, the invention is not restricted to this colour space and can also handle input images compliant with other formats such as BT.2020, BT.601, DCI-P 3, etc.

These colour information R'G'B' correspond to a computer or electrical encoding of the colours of the image elements. An optical electrical conversion operation is performed in T1 to restore the optical intensities of the colours of the image. The RGB optical intensities thus obtained take values between 0 and 1.

For instance, the optical electrical conversion may follow a curve (electrical-optical tone curve) allowing to slightly decrease or increase the intensities of the image colours for some specific tones.

These RGB optical intensities are presented in T2 at an ITMO module (for "Reverse Tone Mapping Operator") whose function is to extend the range of values of the colour intensities of a first interval [0:1] at a second range of values [0:Lmax] where Lmax represents the length of the second interval, $L_{max}$ being an integer greater than 1.

This ITMO module implements the method according to the invention which will be presented hereinafter with reference to FIG. 2. At the output of this module, the image sequence produced is in optical RGB format with intensities between 0 and $L_{max}$.

Each image of the sequence is subjected in T3 to an inverse operation of electrical optical conversion so as to output a sequence of images whose colour intensities correspond to a usable computer encoding for a display device, such as a TV set. For example, the conversion implemented provides colour intensities in the $Y'C_bC_r$ format which decomposes the colour intensities into a luminance component Y' separated from the chrominance components $C_b$, $C_r$. This format $Y'C_bC_r$ is a way of representing the colour space in video that is well suited to the transmission problematics. These components are encoded on 10 bits. As a variant, an additional conversion provides at T4 a sequence of output images in the format R'G'B' encoded on at least 10 bits.

The image sequence obtained is transmitted in T5 to a display device, such as for example a HDR digital television, for example, in accordance with the ST2084 or STD-B67 standard.

Figure 2:
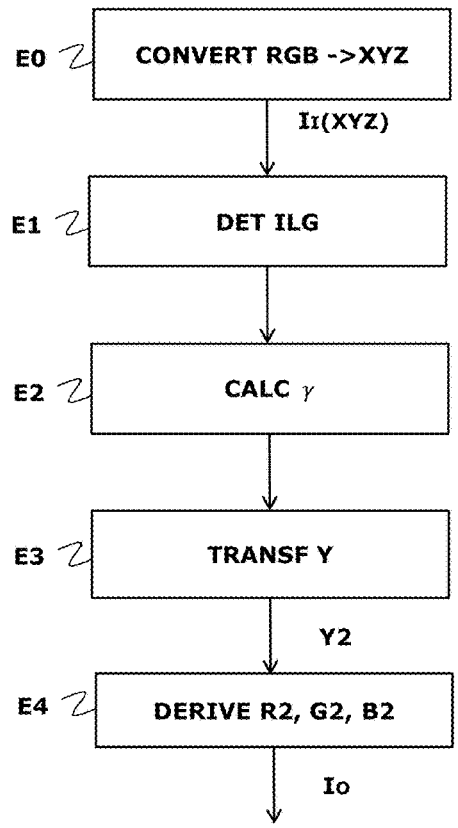
FIG. 2 shows schematically the steps of a method for processing a digital image according to the invention.

In connection with FIG. 2, the steps of a method for processing a digital image according to an embodiment of the invention are described.

It is assumed that the optical colour intensities of the input image are expressed in RGB format.

In a first step E0, the colour intensities of the input image are converted into a colour space that comprises a luminance Y component and X and Z chrominance components. It is understood that in this space, an information representative of a luminosity level of the image at each of its points is separated from the so-called chrominance information which defines its colour.

In E1, an information representative of a global luminosity level of the input image, as perceived by the visual system of an observer, is determined.

According to a first embodiment of the invention, the determined information is the key k of the image as defined by Masia.

According to a second embodiment of the invention, described with reference to FIG. 3, the global luminosity level information is determined in another manner, defined below:

In E11, the luminance component Y is converted into another luminance component L*, so-called brightness component, of a colour space called CIE L*a*b*. The brightness component L* can take values between 0 (black) and 100 (white). This is a colour space for surface colours, defined by the International Commission on Illumination, (CIE) together with the CIE L*u*v* colour space for light colours. Based on the evaluations of the CIE XYZ system, it was designed to more accurately reflect the differences in colours perceived by human vision.

In this model, three magnitudes characterise the colours, the brightness L*, derived from the luminance (Y) of the XYZ evaluation, and two parameters a* and b*, which express the difference in colour from that of a grey surface of the same brightness, such as the chrominance of a sequence of images.

As an alternative, this step may be skipped.

During a step E12, the median value $L_{med}^*$ of the brightness component L* is calculated on all the elements of the input image IIn.

As an alternative, when the brightness L* is not obtained, a median value $Y_{med}$ is calculated from the luminance component values on all the elements of the input image IIn.

As an alternative, a mean value of the brightness or the luminance component value is obtained.

It is assumed that the image $II_n$ has M image elements, with M non-zero integers.

For example, the median value is calculated by sorting the values of the luminosity components of the elements of the image in ascending order, the median value $L_{med}^*$ corresponding to the position (M+1)/2.

During a step E13, the median value obtained is normalised, so that its value is between 0 and 1. We have:

$$L_{med,n}^* = \frac{L_{med}^*}{100} \quad (4)$$

As an alternative, the normalizing step is skipped for $Y_{med}$, as the values of $Y_{med}$ are already comprised in the following range [a,b] or ]a,b] where a≥0 and b≤1. According to a preferred embodiment, a=0 and b=1.

In E14, the possible values for the median value of the normalised brightness are clipped, while excluding the extreme values of the interval [0,1]. The new range of possible values is [0.05, 0.95].

Thus, we obtain an information representative of a global level of luminosity of the input image equal to the normalised median value, which is clipped from the brightness component or the luminance component value, depending on the concerned alternative:

$$ILG = \overline{L_{med,n}^*} \text{ or } ILG = Y_{med} \quad (5)$$

In relation to FIG. 2, the next step E2 of the processing method according to the invention calculates an expansion coefficient γ as a function of the information representative of a luminosity level of the ILG input image. This expansion coefficient is intended to be applied to the luminance component $Y_1$ of the input image IIn. According to the invention, the expansion coefficient γ is calculated as a decreasing function of the ILG information.

According to a first embodiment of the invention, presented in relation to FIG. 4A, the expansion coefficient γ is calculated as a decreasing polynomial function of the ILG information. For example, the expansion coefficient γ is defined as follows:

$$\gamma = \alpha \cdot ILG^2 - \beta \cdot ILG + \rho \quad (6)$$

with α=1.5, β=2.6 and ρ=2.2

According to a second embodiment of the invention, presented in relation to FIG. 4A, the expansion coefficient γ is calculated a logarithmic function of the inverse luminosity ILG information of the input image:

$$\gamma = 1 + \log_{10} \frac{1}{ILG} \quad (7)$$

In these two examples, the ILG information is chosen equal to $\overline{L_{med,n}^*}$.

Of course, the invention is not limited to this particular case. Other ways of calculating the ILG information can be envisaged, for example from the key of the image k.

An advantage of this function is that it does correspond to the perception model of the human visual system. In addition, it is simple to calculate.

Of course, the invention is not limited to the use of these two examples. Other curves of models can be used.

Thus according to another embodiment of the invention, the expansion coefficient γ is calculated from a logarithmic function of the ILG information, for example γ may be proportional to the inverse of the logarithm of the ILG information of the input image:

$$\gamma = \frac{1}{\text{gain} \times \log_{10}(Y_{med}) + \text{offset}} \quad (7a)$$

where $\log_{10}$ designates the decimal logarithm, γ the expansion exponent applied to the first luminance component Y1, $Y_{med}$ the median luminance value which is normalised and clipped, gain a predetermined gain value and offset a predetermined offset value.

This expression allows to obtain more suitable values of γ, when tone curves are used for the step T1, allowing a better visual rendering.

For instance range of possible values for the gain is [0.01, 1].

For instance range of possible values for the offset is [0, 10].

Preferably, the value of γ is clipped at [c, d] where c≥1 and d≥2.

During a step E3, the luminance component $Y_1$ of the input image is transformed by applying the expansion coefficient γ:

$$Y_1' = Y_1^\gamma \quad (8)$$

$$\text{with } \gamma = 1 + \log_{10} \frac{1}{ILG} \text{ or } \gamma = \frac{1}{\text{gain} \times \log_{10}(Y_{med}) + \text{offset}}$$

and multiplying, for each element of the input image IIn, the luminance value Y by the amplitude of the luminance value interval s of the display device $L_{max}$.

$$Y_2 = L_{max} \cdot Y_1' \quad (9)$$

For example, with an HDR screen standard such as ST 2084, if the maximum luminosity level of the screen is 1000 nits or cd/m², then $L_{max}$ is 1000.

In E4, the first chrominance components C1 of the image are transformed into second components C2.

When the first components C1 are expressed in the form of three light intensity values R1, G1, B1 of the RGB colour space, three second components R2, G2, B2 are obtained.

Several embodiments are considered.

FIG. 5 shows the steps of the method for processing an input image ($II_n$) according to the invention, when the input image is in standard SDR format and the display device is configured to render images ($II_n$) in HDR format.

According to a first embodiment, illustrated in FIG. 5, the first chrominance components C1 are multiplied by an expansion coefficient proportional to the expansion applied to the luminance of the image, for example equal to the $Y_2/Y_1$ ratio, as follows:

$$C_2 = \frac{C_1 \cdot Y2}{Y_1} \quad (10)$$

In the RGB colour space, we get:

$$R_2 = \frac{R_1 \cdot Y2}{Y_1} \quad (11)$$

$$G_2 = \frac{G_1 \cdot Y2}{Y_1} \quad (12)$$

$$B_2 = \frac{B_1 \cdot Y2}{Y_1} \quad (13)$$

An advantage of this mode is its simplicity.

An output image ($IO_n$) is thus obtained whose colour intensities take a wider range of values and adapted to the amplitude offered by the display device.

Figure 6A:
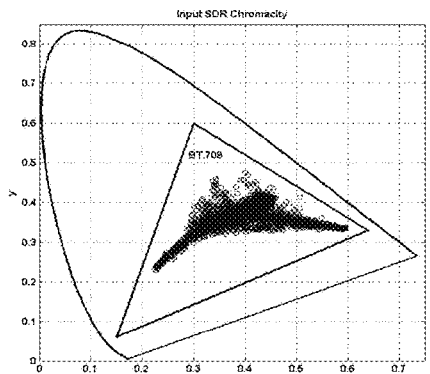
Figure 6B:
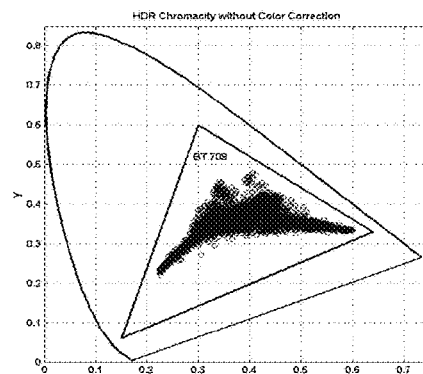

To synthesise colours, a gamut or a colour gamut designate the portion of all the colours that a certain type of material, such as a TV screen or a computer monitor enable to render. The gamut depends on the primary colours used to synthesise colours. It is often plotted on an area on a chromaticity diagram by a polygon linking the points representative of these primaries. FIG. 6A shows the cloud of colour intensities taken by the input image in the gamut according to the BT709 recommendation adapted to HDTV (for «High Definition TV»). FIG. 6B shows that of the output image obtained by the first embodiment of the invention which has just been described in relation to FIG. 5.

According to a second embodiment, illustrated in FIG. 5A, the step E4 comprises a substep E41 for correcting the colour components, which consists in applying to the first chrominance components a correction function that is no longer directly proportional to the Y2/Y1 ratio between output luminance and input luminance, as in the previous embodiment. According to this second embodiment, the correction function that applies to the first luminance components, depends on the first and second luminance components and a saturation factor s, which is a real number, preferably greater than 1, according to the following expression:

$$C_2 = \left(\left(\frac{C_1}{Y_1} - 1\right) \cdot s + 1\right) Y_2 \quad (14)$$

In the RGB colour space, we get:

$$R_2 = \left(\left(\frac{R_1}{Y_1} - 1\right) \cdot s + 1\right) Y_2 \quad (15)$$

$$G_2 = \left(\left(\frac{G_1}{Y_1} - 1\right) \cdot s + 1\right) Y_2 \quad (16)$$

$$B_2 = \left(\left(\frac{B_1}{Y_1} - 1\right) \cdot s + 1\right) Y_2 \quad (17)$$

For example, the saturation factor s is chosen equal to 1.25.

An advantage of this correction is that by saturating the intensities of the colour components, it allows to obtain a more intense colour rendering.

Advantageously, the step E 4 further comprises a substep E42 for converting the second chrominance components of a first colour space, larger than the first.

A conversion of a gamut A to a gamut B can be done by matrix transformation as follows:

$$\begin{bmatrix} R_2' \\ G_2' \\ B_2' \end{bmatrix}_{Gamut B} = \begin{bmatrix} a_1 & a_2 & a_3 \\ a_4 & a_5 & a_6 \\ a_7 & a_8 & a_9 \end{bmatrix} \cdot \begin{bmatrix} R_2 \\ G_2 \\ B_2 \end{bmatrix}_{Gamut A} \quad (18)$$

For example, the intensities R2, G2, B2 obtained, which belong to a first colour space, for example according to the BT709 recommendation, are converted into intensities R2', G2', B2' in a second colour space such as the new space according to the BT2020 recommendation recently created for the new UHDTV screens (for "Ultra High Definition Television" set).

In this case, the conversion of the gamut according to the BT709 recommendation to the gamut according to the BT2020 recommendation is done by applying the following matrix, as specified in the BT2087 recommendation:

$$\begin{bmatrix} R_2' \\ G_2' \\ B_2' \end{bmatrix}_{BT\cdot 2020} = \begin{bmatrix} 0.6274 & 0.3293 & 0.0433 \\ 0.0691 & 0.9195 & 0.0114 \\ 0.0164 & 0.0880 & 0.8956 \end{bmatrix} \cdot \begin{bmatrix} R_2 \\ G_2 \\ B_2 \end{bmatrix}_{BT\cdot 709} \quad (19)$$

One advantage of this conversion is that it enables, due to increased sizes of the polygon gamut, to ensure that the colour intensities transformed are located away from its borders in the second colour space, which avoids the clipping effects of the colour intensities on the output image.

Figure 6C:
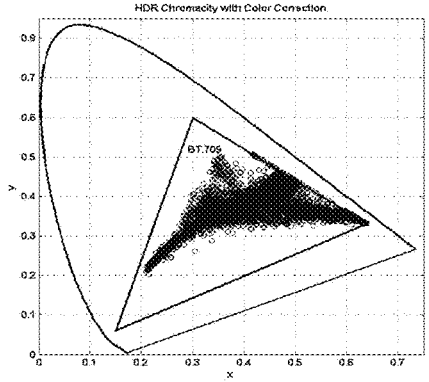

FIG. 6C shows a chromaticity diagram of the output image obtained after the colour correction in step E41 according to the second embodiment. It can be noted that, due to the correction, the range of colour intensities is more extensive in FIG. 6C than in FIG. 6B, which is reflected, when returning the output image, by more intense rendering.

Figure 6D:
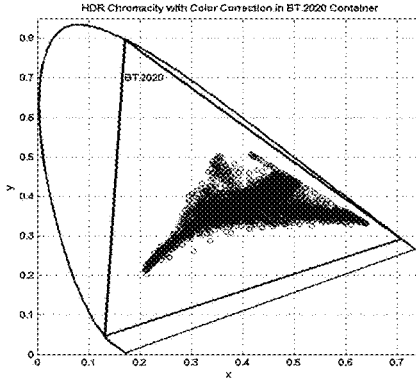

FIG. 6D shows a chromaticity diagram of the output image obtained after the step E42 of colour space change. It can be seen that the change in colour space makes it possible to move the cloud of intensity values away from the boundaries of the gamut triangle, which has the effect of avoiding any truncation of the colour intensities at the edges of the triangle and therefore the appearance of rendering defects on the output image.

For a sequence of images, steps E1 to E4 are repeated for each image.

The invention which has just been presented has been tested on a representative set of image sequences belonging to diversified styles or lighting classes.

Lighting style designates the lighting and contrast conditions selected by an artist to create an image, a photo or a video sequence. These conditions help to give the image a special atmosphere. The notion of style is known and widely used in photography, television and cinema. The three following classes are identified in particular:

Medium-Key Lighting (MK) is a style of shooting images combining a medium contrast to a moderate luminosity. Most of the image and video content falls into this category.

Low-Key Lighting (LK) is a deliberately dark image taking style, thus having a low luminosity associated with a high contrast. The low key style is involved in several effects such as the chiaroscuro. Contrary to standard lighting based on three light sources, the Low-Key technique usually involves only one source.

High-Key lighting (HK) is an image-shooting style which combines high luminosity with low contrast to express a sweet atmosphere. It is a style widely used in the field of fashion and advertising.

Taking into account the two dimensions given by luminance and contrast, the inventors offer a 2D classification comprising the following two additional styles:

Dark-Key Lighting (DK) is a deliberately underexposed image-shooting style thus having a low luminosity associated with a low contrast. It is particularly popular for night scenes, by creating a disturbing atmosphere, raising the suspense in horror movies or in thrillers;

Bright-Key Lighting (BK) is an image-shooting style that combines a high level of contrast with high luminosity. This style is commonly used for outdoor shooting on clear sunny days.

In relation to FIG. 7, the five lighting styles that have just been described have been plotted in a diagram, based on information representative of global luminosity and contrast levels, as perceived by an observer. It can be seen that the classes LK and DK have comparable luminosity levels and are distinguished from each other by their level of contrast. The same goes for classes HK and BK.

In connection with FIGS. 8A to 8E, 9 and 10, we now present the results obtained by the invention. FIGS. 8A to 8E compare for the five classes of images, the plots of the extended luminance values $Y_2$ of the output image according to those $Y_1$ of the input image, respectively obtained by the invention and Akyuz's and Masia's methods, already described. As a reminder, Akyuz's method uses an expansion exponent equal to 1 while Masia's method exploits an exponent expressed as an affine function of the image key.

Figure 8C:
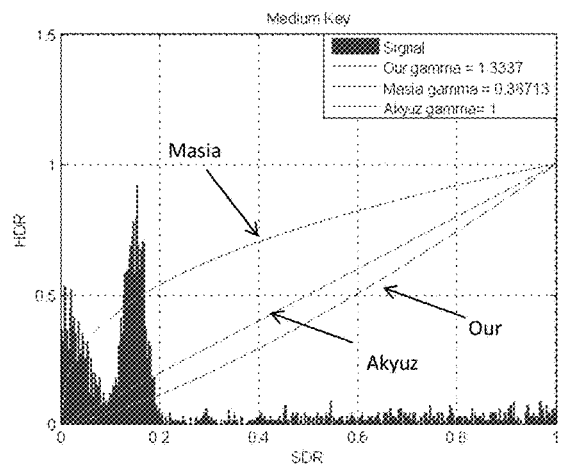
Figure 8A:
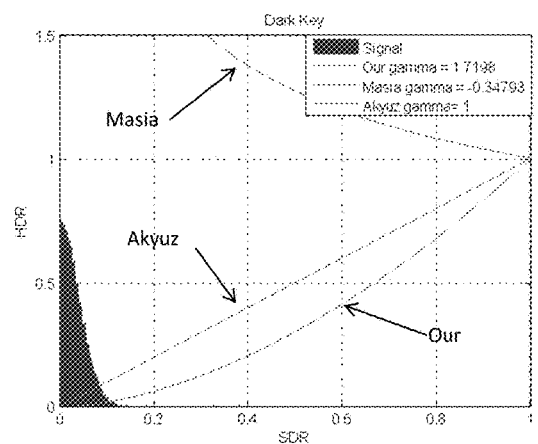

For the image of FIG. 8A, belonging to the Dark Key style class, the expansion exponent $\gamma$ calculated by the invention is 1.72 and that calculated by Masia is −0.35. With Akyuz's method, the expansion is linear, so that all luminances are increased in the same way.

The coefficient calculated by Masia is negative, which has the effect of saturating the luminance values $Y_2$. In relation to FIG. 9, which presents an image of the output sequence obtained by each of the methods and the corresponding original image, as well as aesthetic and accuracy scores attributed by observers, it is checked that the image obtained by Masia's method is very white and has lost all contrast. The image produced by Akyuz's method is of good quality but the original lighting style has been distorted.

Figure 8D:
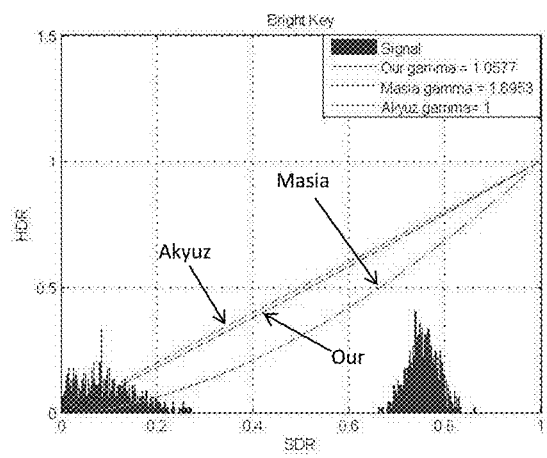
Figure 8B:
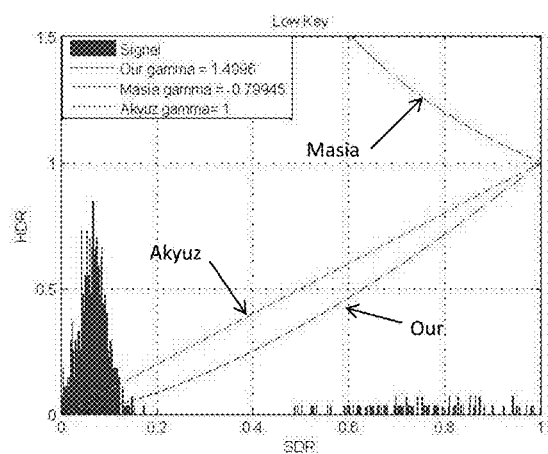

For the image of FIG. 8B, belonging to the Low Key style class, the expansion exponent $\gamma$ calculated by the invention is 1.5 and that calculated by Masia is −0.80. The same observations apply for the images produced by Akyuz and Masia.

For the image of FIG. 8C, belonging to the Medium Key style class, the expansion exponent $\gamma$ calculated by the invention is 1.34 and that calculated by Masia is 0.39. The plot obtained by the method according to the invention lies below the Akyuz line. It therefore stretches the intermediate luminance values less than Akyuz does. This is verified in FIG. 8, which shows that the version of the image MK extended by the invention globally looks less exposed than the version produced by Akyuz. The image produced by Masia is overexposed and the rendering is unnatural.

For the image of FIG. 8D, belonging to the Bright Key style class, the expansion exponent $\gamma$ calculated by the invention is 1.06 and that calculated by Masia is 1.7. The result obtained by Akyuz is over-illuminated. The one obtained by Masia is too contrasted. In relation to FIG. 8, the scores obtained by Masia are significantly worse than those of Akyuz and those of the invention, notably because of a flickering between the images of the output sequence.

Figure 8E:
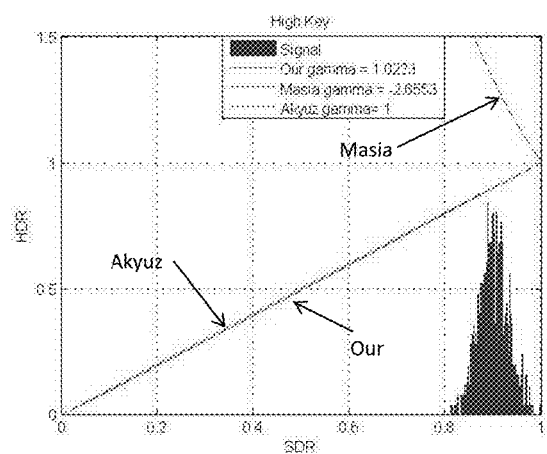

For the image of FIG. 8E, belonging to the High Key style class, the expansion exponent $\gamma$ calculated by the invention is 1.02 and that calculated by Masia is −2.65. The plot of the invention is very close to the Akyuz line, but slightly below. FIG. 8 shows a more significant overexposure of the version produced by Akyuz than that of the invention. In relation with FIG. 9, the image produced by Masia is very white, devoid of any contrast.

In general, it can be noted that Masia's method tends to saturate the luminance values over the entire range of values taken by the input image, which will result in an impression of overexposure and loss of contrast.

Akyuz's method linearly amplifies luminance over the entire range of values. The rendering of the images is acceptable, but the original style of the images has been distorted.

These results emphasise the good results obtained by the invention which faithfully renders the lighting styles of the images processed by the invention.

In relation to FIG. 10, we present the average scores assigned by a set of observers to the images produced by the three methods tested. We distinguish an aesthetic score, from a test without reference and an accuracy score, from a test with reference. It can be seen that the scores obtained by the processing method according to the invention are always higher than those of the other methods, whether from an aesthetic or a fidelity point of view.

The man skilled in the art would be able to adapt the invention to convert the HDR content received in SDR format before display. According to this embodiment, the step E3 is logically reversed to get:

$$Y'_1 = Y_1^{\frac{1}{\gamma}} \quad (8a)$$

with $\gamma = 1 + \log_{10}\frac{1}{ILG}$ or $\gamma = \frac{1}{\text{gain} \times \log_{10}(Y_{med}) + \text{offset}}$ and then $$Y_2 = \frac{Y'_1}{L_{max}}. \quad (9a)$$

Moreover, the electrical optical conversion follow an inverse tone curve than the one used for the conversion from SDR to HDR format.

It will be noted that the invention just described, can be implemented using software and/or hardware components. In this context, the terms "module" and "entity" used in this document, can be either a software component or a hardware component or even a set of hardware and/or software, capable of implementing the function(s) outlined for the module or entity concerned.

In relation to FIG. 11, we now present an example of simplified structure of a device 100 for processing a digital image according to the invention. The device 100 implements the processing method according to the invention which has just been described in connection with FIG. 1.

This FIG. 11 illustrates only a particular way, among several possible, to fulfil the algorithm detailed above in relation to FIG. 2. Indeed, the technique of the invention is carried out indifferently on a reprogrammable computing machine (a personal computer, a DSP processor or a microcontroller) executing a program comprising a sequence of instructions, or on a dedicated computing machine (for example a set of logical gates such as an FPGA or an ASIC, or any other hardware module).

In the case where the invention is implemented on a reprogrammable computing machine, the corresponding program (that is to say the sequence of instructions) can be stored in a removable storage medium (such as for example a floppy disk, a CD-ROM or a DVD-ROM) or not, this storage medium being readable partially or totally by a computer or a processor.

For example, the device 100 comprises a processing unit 110, equipped with a processor µ1 and driven by a computer program Pg1 120, stored in a memory 130 and implementing the method according to the invention.

At initialisation, the code instructions of the computer program $Pg_1$ 120 are for example loaded into a RAM before being executed by the processor of the processing unit 110. The processor of the processing unit 110 implements the steps of the method described above, according to the instructions of the computer program 120.

In this exemplary embodiment of the invention, the device 100 comprises a reprogrammable computing machine or a dedicated computing machine, capable of and configured for:
 obtaining GET a input image I1;
 converting CONV the RGB colour intensities of the input image into a colour space that comprises a luminance Y component and X and Z chrominance components;
 determining DET ILG an information representative of a global luminosity level of the image, perceived by an observer, based on the values of the first luminance component of the elements of the image;
 calculating CALC an expansion exponent γ as a function of the global luminosity level information determined;
 transforming TRANSF the first luminance components of the image elements into second luminance components, comprising for an element of the image, the calculation of an intermediate luminance value by applying the expansion exponent calculated to the first value of luminance component and the multiplication of the calculated intermediate value by the length of the second range of predetermined luminance values.

According to the invention, the calculated expansion exponent γ is a decreasing function of the determined global luminosity level information.

Advantageously, the computing machine is configured to implement the embodiments of the invention which have just been described in relation to FIGS. 2 to 6.

In particular, it is configured to implement a transformation of the first chrominance components into second chrominance components according to the first or second embodiments described in relation to FIGS. 5 and 5A.

The device 100 further comprises a storage unit $M_1$ 140, such as a memory or buffer, able to store, for example, the input image sequence, the calculated expansion coefficient γ and the intermediate luminance values and/or the sequence of output images.

These units are controlled by the processor p1 of the processing unit 110.

Advantageously, such a device 100 may be integrated in a user terminal equipment TU, for example a computer, a set-top box, a digital television set. The device 100 is then arranged to cooperate at least with the following module of the terminal TU:
 a data transmission/reception module E/R, through which a signal comprising encoded data representative of the input image sequence is received from a telecommunications network, for example a wired or hertzian radio network; and/or
 an acquisition module of the input image sequence, such as for example a video camera, for example via an HDMI cable.
 a display device configured to reproduce images with a range of extended colour intensities, such as a TV HDR professional type Sony® BVM-X300 OLED equipped with SLoq3 and ST2084 transfer functions. This device complies with BT.709 and BT.2020 colour standards. It offers a maximum luminosity of 1000 nits.

Thanks to its good performance and its simplicity of implementation, the invention which has just been described allows several uses. Its first application is the conversion of video content in SDR format into a version that can be displayed on an HDR rendering device. For example, it can be implemented live upon receipt of a video content in format SDR, as a post treatment, for its display of the sequence of images on a screen HDR.

For the live production of TV content using several acquisition modules, SDR and HDR, it can be used to convert SDR content into HDR on the fly before mixing with HDR content. It can also prove interesting in film post-production.

Finally, the invention can be implemented at any point of a transmission chain for transcoding a content transmitted in BT.709 HDR format into an HDR format, as specified by the ST2084 or STD-B67 standard.

An exemplary embodiment of the present invention improves the situation discussed above with respect to the prior art.

An exemplary embodiment of the invention in particular overcomes these shortcomings of the prior art.

More precisely, an exemplary embodiment offers a solution that guarantees a more realistic and more respectful rendering of the original lighting style of the input image, while remaining simple to implement and compatible with real-time constraints.

It goes without saying that the embodiments which have been described above have been given by way of purely indicative and non-limiting example, and that many modifications can be easily made by those skilled in the art without departing from the scope of the invention.

The invention claimed is:

1. A method comprising the following acts performed by a processing device:
   receiving at least one digital image, said image comprising image elements, an image element being associated with colour information represented in a first colour space comprising a first luminance component ($Y_1$), said first luminance component having a first value within a first range of predetermined values;
   processing the at least one digital image for rendering on a display device, said display device being adapted to restore second values of second luminance components of the image elements included in a second range of predetermined values, wherein the processing comprises:
   determining an information representative of a global luminosity level of the image perceived by an observer, based on the first values of the first luminance component of the elements of the image;
   calculating an expansion exponent ($\gamma$) as a function of the global luminosity level information determined;
   transforming the first luminance components of the image elements into said second luminance components, comprising for an element of the image, the calculation of an intermediate luminance value by applying the expansion exponent calculated to the first value of the first luminance component, the multiplication of the calculated intermediate value by a length of the second range of predetermined luminance values, and obtaining the second value of the second luminance component based on the multiplied intermediate luminance value,
   wherein the calculated expansion exponent is a decreasing function of the determined global luminosity level information, based on the logarithm of said determined global luminosity level information.

2. The method according to claim 1, wherein the calculated exponent is proportional to the inverse of the logarithm of the information representative of a global luminosity level of the image.

3. The method according to claim 2, wherein determining a global luminosity level comprises obtaining a median value of the luminance component of the image, and wherein the information representative of a global luminosity level of the image is proportional to the median value obtained.

4. The method according to claim 3, wherein when the first range of predetermined values is of length greater than the second range, the transforming act implements the following equations:

$$Y_2 = \left(\frac{Y_1}{L_{max}}\right)^{\frac{1}{\gamma}}$$

$$\text{with } \gamma = \frac{1}{\text{gain} \times \log_{10}(Y_{med}) + \text{offset}}$$

where Y1 designates the first luminance component, Y2 the second luminance component, $L_{max}$ the length of the second range of luminance values, $\log_{10}$ the decimal logarithm, $\gamma$ the expansion exponent applied to the first luminance component Y1, $Y_{med}$ the median luminance value, gain a predetermined gain value and offset a predetermined offset value.

5. The method according to claim 3, wherein when the second range of predetermined values is of length greater than the first range, the transforming act implements the following equations:

$$Y_2 = L_{max} \cdot Y_1^\gamma$$

$$\text{with } \gamma = \frac{1}{\text{gain} \times \log_{10}(Y_{med}) + \text{offset}}$$

where Y1 designates the first luminance component, Y2 the second luminance component, $L_{max}$ the length of the second range of luminance values, $\log_{10}$ the decimal logarithm, $\gamma$ the expansion exponent applied to the first luminance component Y1, $Y_{med}$ the median luminance value, gain a predetermined gain value and offset a predetermined offset value.

6. The method according to claim 1, wherein the first colour space further comprising first chrominance components, said method further comprising transforming the first chrominance components (C1) of the image into second chrominance components (C2), by applying to the first chrominance components an expansion coefficient proportional to a ratio between the second luminance component and the first luminance component, according to the following expression:

$$C_2 = \frac{C_1 \cdot Y2}{Y_1}.$$

7. The method for processing at least one digital image according to claim 1, wherein the first colour space further comprising first chrominance components, said method further comprising transforming the first chrominance components (C1) of the image into second chrominance components (C2), comprising a subact of colour correction by applying to the first chrominance components a correction function which depends on the first and the second luminance components (Y1, Y2) and a saturation factor (s), which is a real number having a predetermined value, according to the following expression:

$$C_2 = \left(\left(\frac{C_1}{Y_1} - 1\right) \cdot s + 1\right) Y_2.$$

8. The method for processing at least one digital image according to claim 1, further comprising prior to the transforming act, setting the expansion exponent to a first predetermined value if the calculated value is less than said first predetermined value or setting the expansion component to a second predetermined value if the calculated value is greater than said second predetermined value.

9. The method for processing at least one digital image according to claim 7, wherein the act of transforming the first chrominance components comprises a sub-act of converting second chrominance components from a first colour space to a second colour space, larger than the former.

10. A device comprising:
a reprogrammable computing machine or a dedicated computing machine, capable of and configured to:
receive at least one digital image, said image comprising image elements, an image element being associated with colour information represented in a first colour space comprising a first luminance component separated from chrominance components, said first luminance component having a first value comprised in a first predetermined value range; and
process the at least one digital image for rendering the image on a display device, said display device being adapted to render second values of second luminance component of the images elements included in a second predetermined range of values, wherein the processing comprises:
determining an information representative of a global luminosity level of the image, perceived by an observer, based on the values of the first luminance component of the elements of the image;
calculating an expansion exponent as a function of the global luminosity level information determined;
transforming the first luminance components of the image elements into said second luminance components, comprising for an element of the image, the calculation of an intermediate luminance value by applying the expansion exponent calculated to the first value of the first luminance component, the multiplication of the intermediate value calculated by a length of the second range of predetermined luminance values, and obtaining the second value of the second luminance component based on the multiplied intermediate luminance value,
wherein the calculated expansion exponent is a decreasing function of the determined global luminosity level information, based on the logarithm of said determined global luminosity level information.

11. A terminal equipment capable of and configured to obtain a sequence of digital images and to transmit a sequence of digital images to the display device, wherein the terminal equipment comprises the device according to claim 10.

12. A non-transitory computer-readable storage medium, storing a computer program product comprising instructions, which when executed by a reprogrammable computing machine configure the computing machine to perform acts comprising:
receiving at least one digital image, said image comprising image elements, an image element being associated with colour information represented in a first colour space comprising a first luminance component ($Y_1$) and first chrominance components, said first luminance component having a first value within a first range of predetermined values;
processing the at least one digital image for rendering on a display device, said display device being adapted to restore second values of second luminance component of the image elements included in a second range of predetermined values, wherein the processing comprises:
determining an information representative of a global luminosity level of the image perceived by an observer, based on the values of the first luminance component of the elements of the image;
calculating an expansion exponent ($\gamma$) as a function of the global luminosity level information determined;
transforming the first luminance components of the image elements into said second luminance components, comprising for an element of the image, the calculation of an intermediate luminance value by applying the expansion exponent calculated to the first value of first luminance component, the multiplication of the calculated intermediate value by a length of the second range of predetermined luminance values, and obtaining the second value of the second luminance component based on the multiplied intermediate luminance value,
wherein the calculated expansion exponent is a decreasing function of the determined global luminosity level information, based on the logarithm of said determined global luminosity level information.

* * * * *